US010853946B2

(12) United States Patent
Nelson et al.

(10) Patent No.: US 10,853,946 B2
(45) Date of Patent: Dec. 1, 2020

(54) PHYSICAL OBJECT BOUNDARY DETECTION TECHNIQUES AND SYSTEMS

(71) Applicant: eBay Inc., San Jose, CA (US)

(72) Inventors: Patrick Ryan Nelson, San Carlos, CA (US); Jinrong Xie, San Jose, CA (US); Randall Chall Fry, Portland, OR (US)

(73) Assignee: eBay Inc., San Jose, CA (US)

( * ) Notice: Subject to any disclaimer, the term of this patent is extended or adjusted under 35 U.S.C. 154(b) by 100 days.

(21) Appl. No.: 15/984,140

(22) Filed: May 18, 2018

(65) Prior Publication Data

US 2019/0355121 A1 Nov. 21, 2019

(51) Int. Cl.
| | | |
|---|---|---|
| *G06K 9/00* | (2006.01) | |
| *G06T 7/13* | (2017.01) | |
| *G06T 7/70* | (2017.01) | |
| *G06Q 10/08* | (2012.01) | |
| *G06T 19/00* | (2011.01) | |

(52) U.S. Cl.
CPC ......... *G06T 7/13* (2017.01); *G06Q 10/08345* (2013.01); *G06T 7/70* (2017.01); *G06T 19/006* (2013.01); *G06T 2207/10028* (2013.01); *G06T 2207/20024* (2013.01); *G06T 2207/20092* (2013.01); *G06T 2210/12* (2013.01)

(58) Field of Classification Search
None
See application file for complete search history.

(56) References Cited

U.S. PATENT DOCUMENTS

| | | |
|---|---|---|
| 8,872,851 B2 | 10/2014 | El Choubassi et al. |
| 9,251,399 B2 | 2/2016 | Hwang et al. |
| 9,396,554 B2 | 7/2016 | Williams et al. |
| (Continued) | | |

FOREIGN PATENT DOCUMENTS

| | | |
|---|---|---|
| CN | 106225678 A | 12/2016 |
| EP | 3232404 A1 | 10/2017 |
| WO | 2019/222061 A1 | 11/2019 |

OTHER PUBLICATIONS

Leo, et al., "Robust Estimation of Object Dimensions and External Defect Detection with a Low-Cost Sensor", Journal of Nondestructive Evaluation, Mar. 2017, 21 pages.
(Continued)

*Primary Examiner* — Delomia L Gilliard
(74) *Attorney, Agent, or Firm* — SBMC

(57) ABSTRACT

Physical object boundary detection techniques and systems are described. In one example, an augmented reality module generates three dimensional point cloud data. This data describes depths at respective points within a physical environment that includes the physical object. A physical object boundary detection module is then employed to filter the point cloud data by removing points that correspond to a ground plane. The module then performs a nearest neighbor search to locate a subset of the points within the filtered point cloud data that correspond to the physical object. Based on this subset, the module projects the subset of points onto the ground plane to generate a two-dimensional boundary. The two-dimensional boundary is then extruded based on a height determined from a point having a maximum distance from the ground plane from the filtered cloud point data.

20 Claims, 12 Drawing Sheets

(56) References Cited

U.S. PATENT DOCUMENTS

| | | |
|---|---|---|
| 9,600,892 B2 | 3/2017 | Patel et al. |
| 9,633,483 B1 | 4/2017 | Xu et al. |
| 9,870,645 B2 | 1/2018 | Montaigne et al. |
| 2013/0293539 A1* | 11/2013 | Hunt .................. G01B 11/00 345/420 |
| 2013/0321398 A1* | 12/2013 | Howard ............... G06T 19/00 345/419 |
| 2014/0192050 A1 | 7/2014 | Qiu et al. |
| 2015/0062120 A1* | 3/2015 | Reisner-Kollmann ................... G06T 17/00 345/419 |
| 2015/0086114 A1* | 3/2015 | Todeschini ............ G06K 9/00 382/189 |
| 2015/0187067 A1 | 7/2015 | Bendall et al. |
| 2016/0025982 A1* | 1/2016 | Sutherland ......... G02B 27/0172 359/13 |
| 2016/0027212 A1* | 1/2016 | Da Veiga ........... G02B 27/0172 345/633 |
| 2016/0078663 A1* | 3/2016 | Sareen ................. G06T 19/00 345/419 |
| 2016/0171771 A1* | 6/2016 | Pedrotti .............. G02B 27/017 345/633 |
| 2017/0017301 A1* | 1/2017 | Doornenbal ........ G06F 3/04845 |
| 2017/0091957 A1 | 3/2017 | Driegen et al. |
| 2017/0302905 A1* | 10/2017 | Shteinfeld ............ H04N 13/204 |
| 2018/0081995 A1* | 3/2018 | Horhammer .......... G06F 16/283 |
| 2018/0095276 A1* | 4/2018 | Ng-Thow-Hing ........................... G06K 9/00671 |
| 2019/0122393 A1* | 4/2019 | Sinharoy .................. G06T 7/73 |

OTHER PUBLICATIONS

International Search Report received for PCT Application No. PCT/US2019/031842, dated Oct. 16, 2019, 8 pages.
International Written Opinion received for PCT Application No. PCT/US2019/031842, dated Oct. 16, 2019, 11 pages.
Invitation to Pay Additional Fees received for PCT Application No. PCT/US2019/031842, dated Aug. 21, 2019, 15 pages.

* cited by examiner

PHYSICAL OBJECT BOUNDARY DETECTION TECHNIQUES AND SYSTEMS

BACKGROUND

Conventional techniques used to estimate shipping costs and packaging materials are modal and require multiple different devices, which may not be readily available to a user. The user, for instance, may wish to ship a physical object. To do so, the user first employs a tape measure to determine dimensions of the physical object. The user then determines a size of available packaging (e.g., an envelope or box size) that corresponds to these dimensions, and also makes a best guess as to an amount of fill to be used in the packaging. To do so, the user may access a website, from which, these materials are available, physically journey to a store to purchase these materials based on the remembered dimensions, and so forth. Thus, these conventional techniques are not capable of determining an appropriate sizing of packaging materials (e.g., box sizes), but rather are limited to finding rough dimensions of an object, at best, using a variety of tools that may not be readily available. Because of this, conventional techniques rely on a "best guess" on the part of the user, which is inaccurate, frustrating, and costly due to inaccuracies in obtaining excess amounts of packaging "just to be sure." Similar frustrations may also be encountered in determining an estimate of shipping costs of the physical object. Accordingly, these conventional techniques are inefficient and result in user frustration.

SUMMARY

Physical object boundary detection techniques and systems are described that overcome the challenges of conventional techniques through improved accuracy achieved in calculating a three-dimensional boundary of a physical object. This may be performed, for instance, using a device that is readily available to typical users, e.g., a mobile phone. The three-dimensional boundary may then be used to obtain shipping data automatically and without user intervention, e.g., shipping costs, order packaging, and so forth.

In one example, an augmented reality module generates three-dimensional point cloud data. This data describes depths at respective points within a physical environment that includes the physical object. A physical object boundary detection module is then employed to filter the point cloud data by removing points that correspond to a ground plane. A user input is received in this example to select a location that corresponds to the physical object. The physical object boundary detection module then performs a nearest neighbor search to locate a subset of the points within the filtered point cloud data that correspond to the physical object.

Based on this subset, the physical object boundary detection module projects the subset of points onto the ground plane to generate a two-dimensional boundary, e.g., a two-dimensional bounding box. The two-dimensional boundary is then extruded to form a three-dimensional boundary based on a height determined from a point having a maximum distance from the ground plane from the filtered cloud point data.

In another example, the point cloud data is also generated by the AR module using a three-dimensional sensing device and point cloud generation module. Boundaries (e.g., rectangular boundaries) are computed in two dimensions for each of the perspectives, e.g., upon a surface on which the physical object is disposed. At least one of these two-dimensional boundaries is selected by the module for use in computing a three-dimensional boundary, e.g., a three-dimensional boundary. To do so, the selected two-dimensional boundary is used to generate a three-dimensional boundary having dimensions based on the selected two-dimensional boundary and a height of the physical object detected using the point cloud data.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
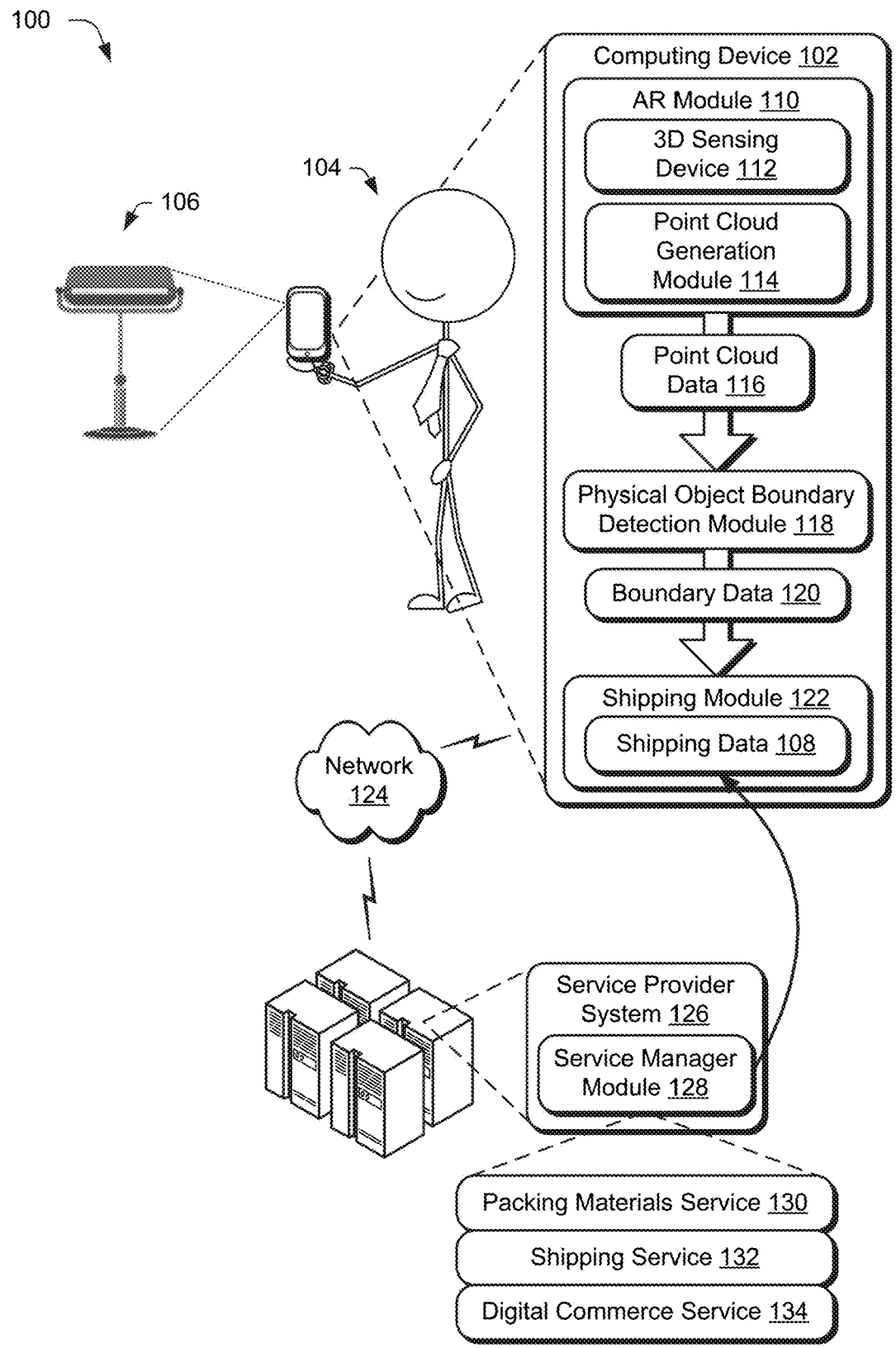
FIG. 1 is an illustration of an environment in an example implementation that is operable to employ techniques described herein.

Physical object boundary detection techniques and systems are described. These techniques support calculation of a three-dimensional boundary for a physical object, e.g., as a three-dimensional bounding box including dimensions of height, width, and depth. To do so, point cloud data is generated by an AR module of a computing device that describes depths of points within a physical environment, e.g., which may be included as part of a mobile phone and thus readily available to a user. The point cloud data is then used by the computing device to determine a three-dimensional boundary (e.g., a bounding box) of a physical object in the physical environment. The three-dimensional boundary may then be used to support a variety of functionality, such as to generate shipping data to recommend packaging materials for use in packing the physical object (e.g., boxes, tubes, envelopes), an estimated shipping cost of the physical object, and may include formation of digital content that is configured to offer the physical object for sale that includes the shipping data. In this way, the techniques described herein overcome the challenges of conventional techniques and thus may determine appropriate packing sizing for a physical object, rather than limited to projection of a pre-defined box based on pre-defined measures and "best guesses" of conventional techniques.

A user, for instance, may launch an application that is associated with a service provider system to offer products for sale. The application is configured to generate digital content in this example as part of the offer for sale, e.g., a webpage, screen in a mobile application, and so on. As part of this, the application may include a user interface usable to specify a text description of the physical object, support capture of digital images of the physical object, and may also include shipping data for the object.

The shipping data is generated in this example automatically and without user intervention in response to a user input received via the user interface to initiate generation of the shipping data. The shipping data may be based on dimensions of a three-dimensional boundary that is calculated through execution of the application by the computing device.

In a first example, an augmented reality module of the computing device includes a three-dimensional sensing device and a point cloud generation module that are configured to generate three-dimensional point cloud data. This data describes depths at respective points within a physical environment that includes the physical object, e.g., a depth map. These depths may be determined using a variety of functionality, examples of which include use of digital images and motion detection sensors to determine parallax, use of radio waves (e.g., Wi-Fi waves as part of Project Tango), time-of-flight cameras, structured light grid arrays, and so forth. In some instances, the point cloud data may have a resolution (i.e., number of points) that may cause inefficiencies in processing. Therefore, in such instances the point cloud data is down sampled thereby improving operation of the computing device.

A physical object boundary detection module is then employed to filter the point cloud data by removing points that correspond to a ground plane. A user input, for instance, may be received with respect to a digital image (e.g., a live camera feed) that is displayed in a user interface that corresponds to point cloud data being generated. The user may then "tap" on a portion of the image that corresponds to the ground plane, e.g., a surface on which the physical object is disposed. The physical object boundary detection module then removes points that correspond to the ground plane using a nearest neighbor search. This acts to isolate points above the ground plane and thus likely correspond to the physical object. In another example, the ground plane is detected automatically and without user intervention by the module.

Another user input is received in this example to select a location that corresponds to the physical object. To do so, the user then "taps" the location in the digital image (e.g., the live camera feed) and the physical object boundary detection module performs a nearest neighbor search to locate a subset of the points within the filtered point cloud data that correspond to the physical object.

Based on this subset, the physical object boundary detection module projects the subset of points onto the ground plane to generate a two-dimensional boundary, e.g., a bounding box. The two-dimensional boundary is then extruded based on a height determined from a point having a maximum distance from the ground plane from the filtered cloud point data to form a three-dimensional boundary. The three-dimensional boundary thus includes dimensions that define maximum outer dimensions of the physical object, e.g., width, depth, and height.

The three-dimensional boundary may support a variety of functionality, such as to generate shipping data that recommends packaging materials to pack the physical object, estimate a shipping cost of the physical object, and so forth. Continuing with the previous example, the shipping data may be included by the module automatically and without user intervention as part of the digital content offering the physical object for sale. In this way, the techniques described herein improve efficiency of user interaction with the computing device in a non-modal manner in which a user may remain within a context of the application to efficiently generate the shipping costs for inclusion as part of the digital content.

In another example, the point cloud data is also generated by the AR module using a three-dimensional sensing device and point cloud generation module. In this example, the point cloud data is generated from multiple different perspectives. Two-dimensional boundaries are computed in two dimensions for each of the perspectives, e.g., as two-dimensional bounding boxes upon a surface on which the physical object is disposed.

At least one of these two-dimensional boundaries is selected by the module for use in computing a three-dimensional boundary. The selection, for instance, may be based on which of the two-dimensional boundaries is the smallest, e.g., by area. The selected two-dimensional boundary is then used to generate a bounding box or other shape (e.g., selected from dimensions of available packaging materials) having dimensions based on the selected two-dimensional boundary and a height of the physical object detected using the point cloud data to generate a three-dimensional boundary. The three-dimensional boundary may then be used to support a variety of functionality, such as to output dimensions of the physical object, generation of augmented reality content showing the dimensions and box, generation of shipping data, and so on. Further discussion of these and other examples is included in the following sections and shown using corresponding figures.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ physical object boundary detection techniques described herein. The illustrated environment 100 includes a computing device 102 illustrated as being held by a user 104. The computing device 102 may be configured in a variety of ways.

The computing device 102, for instance, may be configured as a desktop computer, a laptop computer, a mobile device (e.g., assuming a handheld configuration such as a tablet or mobile phone as illustrated), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as described in FIG. 14.

In the illustrated example, the computing device 102 is configured to capture data of a physical environment, in which, a physical object 106 is disposed to generate shipping data 108. To do so, the computing device 102 leverages an AR module 110. The AR module 110 includes a three dimensional (3D) sensing device 112 and a point cloud generation module 114 that are configured to generate point cloud data 116 that describes depths at respective points within the physical environment. Following a right-handed convention, for instance, the point cloud data 116 may describe points in which a y-axis is vertical, and x-axis is horizontal, and a z-axis defines depth as part of a coordinate system.

In one example, the 3D sensing device 112 and point cloud generation module 114 employ a technique referred to as visual-inertial odometry in which the 3D sensing device 112 includes motion detection sensors (e.g., gyroscopes, accelerometers) and a camera to capture digital images of the physical environment. The point cloud generation module 114 is configured to perform computer vision analysis of the digital images to recognize features in the digital images and track differences in positions of these features.

The point cloud generation module 114 compares motion sensing data from the motion detection sensors with the tracked differences in feature positions to generate point cloud data 116 that models depths of points in the physical environment, e.g., as a depth map. In this way, the AR module 110 may track position of the computing device 102 as it moves to build an understanding of the physical environment based on features identified from digital images. This functionality may also support ground plane detection, e.g., flat surface such as a floor or table. Thus, in this example the point cloud data 116 may be generated without specialized hardware by a wide range of mobile computing devices, e.g., smartphones and tablets.

In another example, dedicated hardware is leveraged to emit radio waves (e.g., Wi-Fi waves), the return of which is sensed (e.g., using radar techniques) by the 3D sensing device 112. This includes use of motion tracking as described above (e.g., using accelerometers, barometers, GPS, and/or gyroscopes) such that the point cloud generation module 114 may gain an understanding of depths of points within the physical environment in order to generate the point cloud data 116. Other examples are also contemplated, such as time-of-flight cameras, structured light grid array devices, and so forth.

The point cloud data 116 is then exposed by the AR module 110 via an application programming interface (API) to a physical object boundary detection module 118. This module is representative of functionality to generate boundary data 120 that describes outer dimensions of the physical object 106 based on the point cloud data 116 as boundaries, e.g., three-dimensional polygons, tubes, and so forth.

The boundary data 120 may support a variety of functionality, such as to indicate dimensions of the physical object 106 as augmented reality digital content as part of a live camera feed output by the computing device. In the illustrated example, the boundary data 120 is received as an input by a shipping module 122 to generate shipping data 108. The shipping module 122, for instance, may communicate the boundary data 120 via a network 124 to a service provider system 126. The service provider system 126 includes a service manager module 128 that is configured to generate the shipping data 108. The service manager module 128, for instance, may employ a packing materials service 130 that is configured to determine packing materials (e.g., box, tube, envelope, and filler size) to be used to pack the physical object 106. In another instance, a shipping service 132 is configured to estimate shipping costs of the physical object 106. In a further instance, a digital commerce service 134 employs the boundary data 120 as part of generation of digital content, e.g., a webpage having an offer to sell the physical object 106 by the user 104.

The physical object boundary detection module 118 and shipping module 122, for instance, may be incorporated as part of an application that corresponds to the service provider system 126. The service provider system 126 is configured in this example to offer physical objects for sale by publishing digital content, e.g., webpages, screens in a user interface of the application, and so on.

Accordingly, the user 104 may interact with the application to generate digital content (e.g., a webpage, screen of an application) that offers the physical object 106 for sale. As part of this, the shipping module 122 is configured to generate shipping data 108 within a context of the application, and thus is non-modal. This may include automated ordering of packaging materials, listing of estimated shipping costs, and so forth which may be included as part of the digital content. In this way, generation of the boundary data 120 may improve user efficiency in interaction with the computing device 102, and may do so in real time.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Physical Object Boundary Detection

Figure 2:
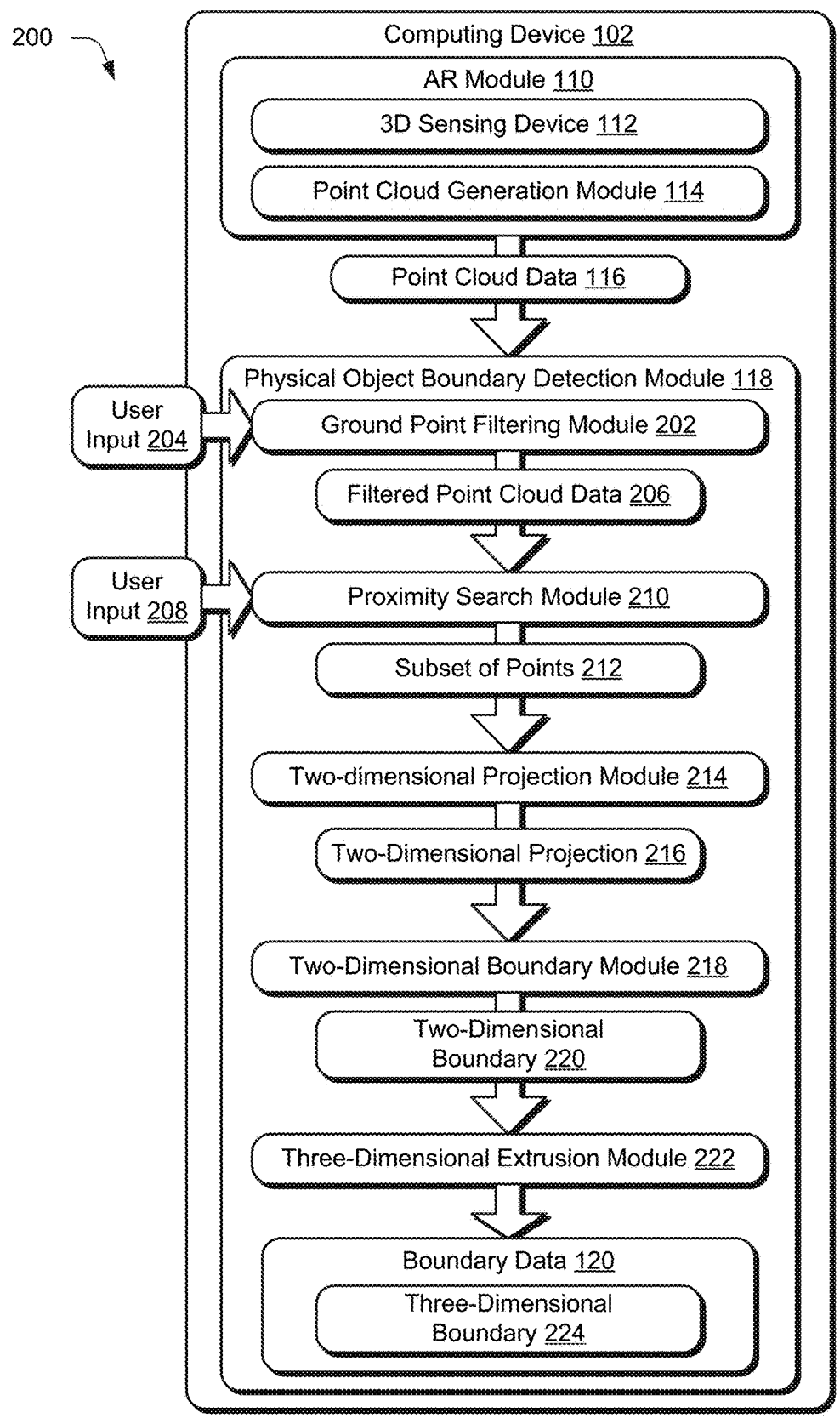
FIG. 2 depicts a system in an example implementation showing operation of the AR module and physical object boundary detection module of FIG. 1 in greater detail.
Figure 10:
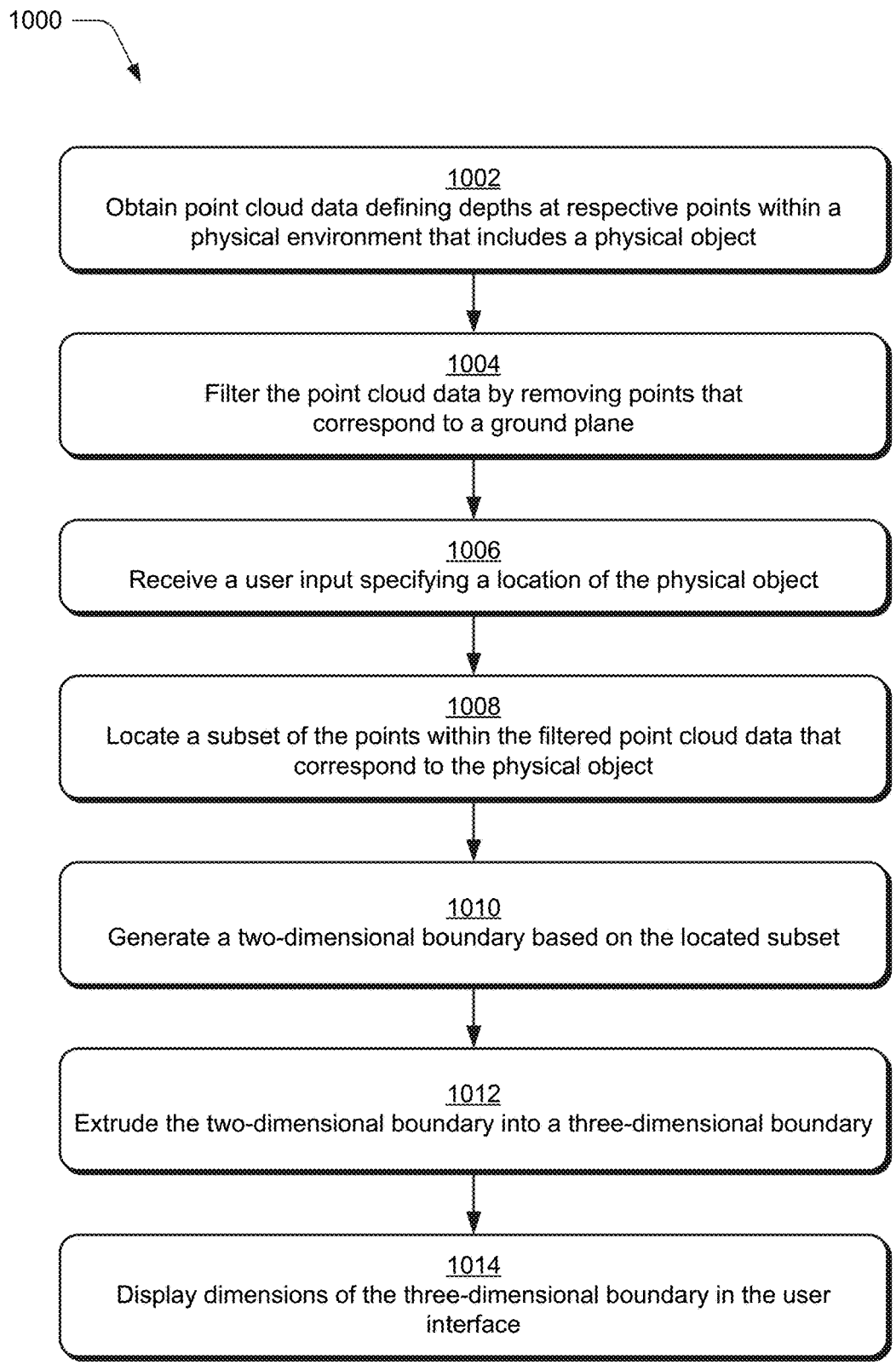
FIG. 10 is a flow diagram depicting a procedure in an example implementation in which a three-dimensional boundary is generated based on point cloud data obtained from an AR module.

FIG. 2 depicts a system 200 in an example implementation showing operation of the AR module 110 and physical object boundary detection module 118 of FIG. 1 in greater detail. FIG. 10 depicts a procedure 1000 in an example implementation in which a three-dimensional boundary is generated based on point cloud data obtained from an AR module. Although a three-dimensional bounding box is described in this example, other shapes are also contemplated, such as tubes, polygons, triangular columns, envelopes, and so forth.

The following discussion describes techniques that may be implemented utilizing the described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference made interchangeably to FIGS. 2 and 10.

In this example, augmented reality functionality that is made available on a computing device 102 (e.g., a mobile phone) is leveraged to obtain measurements of the physical object 106 as a three-dimensional boundary. In this instance, the three-dimensional boundary does not reconstruct a geometry of the physical object, but rather creates a minimum bounding box for ease of packaging selection and shipping cost estimation.

To do so, point cloud data 116 is first obtained that defines depths at respective points within a physical environment that includes the physical object 106 (block 1002). Thus, the point cloud data 116 is configured as a representation of a three-dimensional physical environment by the AR module 110. This may be performed in a variety of ways, such as through use of radar techniques, visual-inertial odometry, time-of-flight cameras, structured light grid techniques, and so forth.

Figure 3:
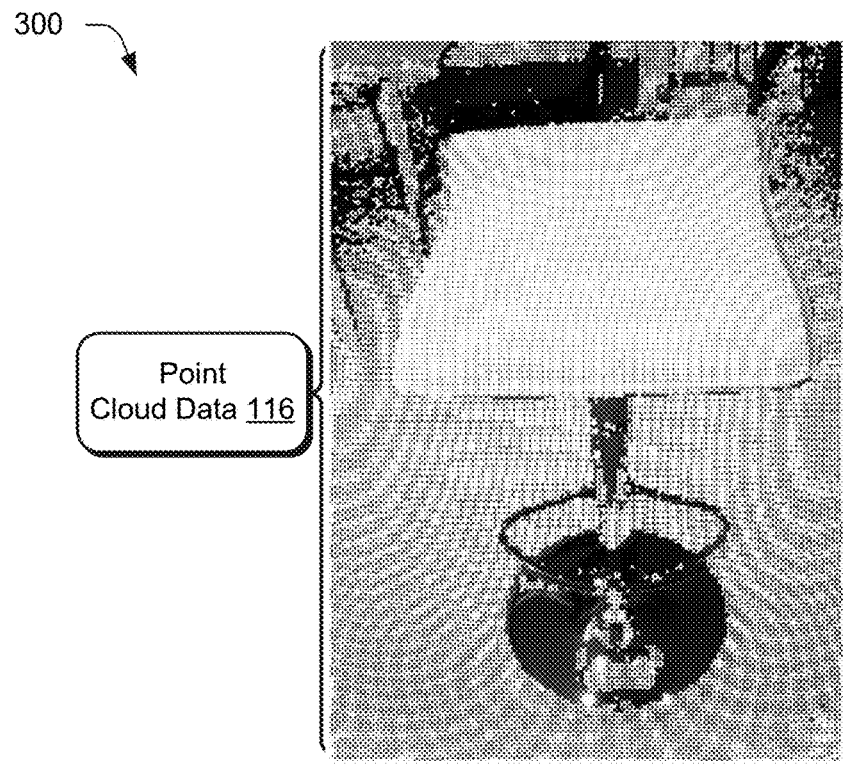
FIG. 3 depicts an example of point cloud data.

An example 300 of point cloud data 116 is illustrated in FIG. 3 in which a physical object 116 of a lamp is included on a table in a physical environment. In some instances, the point cloud data 116 may include a multitude of points (e.g., 250,000) that may limit operation of the computing device. Therefore, in such instances the point cloud data 116 may be down sampled (e.g., to one in twenty points per frame thereby processing 15,000 points) to improve operational efficiency of the computing device 102, e.g., to support real time output.

As previously described, the computing device 102 may leverage an AR module 110 to generate the point cloud data 116. The AR module 110 includes a three dimensional (3D) sensing device 112 and a point cloud generation module 114 that are configured to generate point cloud data 116 that describes depths at respective points within the physical environment. In a right-handed convention, for instance, the point cloud data 116 may describe points in which a y-axis is vertical, and x-axis is horizontal, and a z-axis defines depth as part of a coordinate system.

In one example, the 3D sensing device 112 and point cloud generation module 114 employ a technique referred to as visual-inertial odometry in which the 3D sensing device 112 includes motion detection sensors (e.g., gyroscopes, accelerometers) and a camera to capture digital images of the physical environment. The point cloud generation module 114 is configured to perform computer vision analysis of the digital images to recognize features in the digital images and track differences in positions of these features.

The point cloud generation module 114 compares motion sensing data from the motion detection sensors with the tracked differences in feature positions to generate point cloud data 116 that models depths of points in the physical environment, e.g., as a depth map. In this way, the AR module 110 may track position of the computing device 102 as it moves to build an understanding of the physical environment based on features identified from digital images. This functionality may also support ground plane detection, e.g., flat surface such as a floor or table. Thus, in this example the point cloud data 116 may be generated without specialized hardware by a wide range of mobile computing devices, e.g., smartphones and tablets.

In another example, dedicated hardware is leveraged to emit radio waves (e.g., Wi-Fi waves), the return of which is sensed (e.g., using radar techniques) by the 3D sensing device 112. This includes use of motion tracking as described above (e.g., using accelerometers, barometers, GPS, and/or gyroscopes) such that the point cloud generation module 114 may gain an understanding of depths of points within the physical environment in order to generate the point cloud data 116. Other examples are also contemplated, such as time-of-flight cameras, structured light grid array devices, and so forth.

The point cloud data 116 is then filtered by a ground point filtering module 202 by removing points that correspond to a ground plane (block 1004). A user input 204, for instance, may be received via a user interface that displays a digital image that corresponds to the point cloud data 116, e.g., as a live camera feed from a digital camera of the computing device 102. The user input 204 specifies a location of a ground plane in the digital image, and thus may be correlated by the ground point filtering module 202 to a ground plane in the point cloud data 116.

Figure 4:
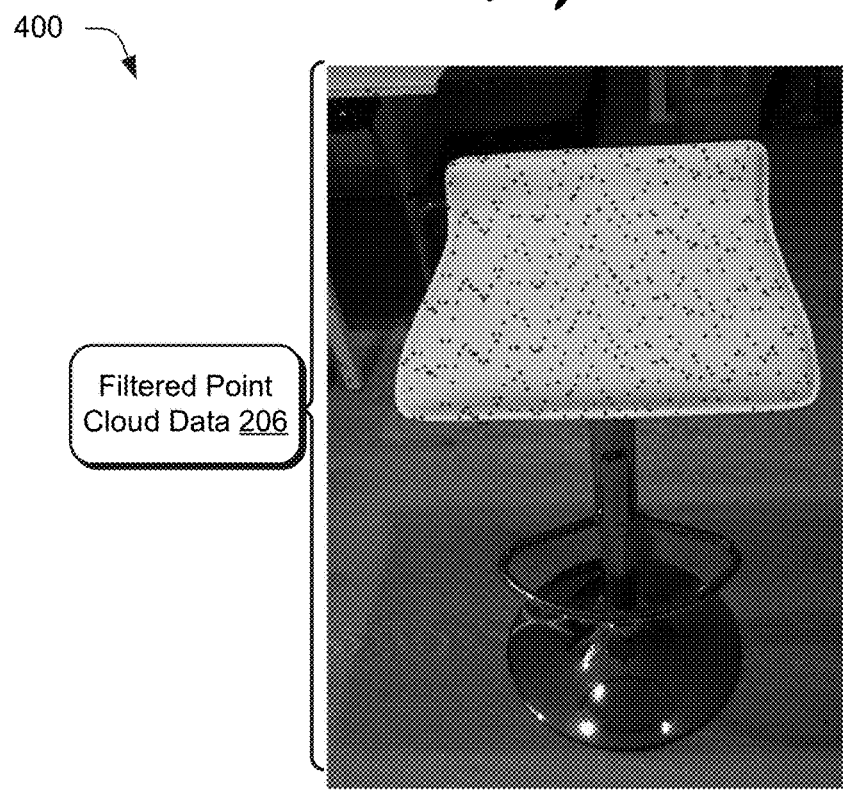
FIG. 4 depicts an example of filtered point cloud data generated from the point cloud data of FIG. 3.

Points that correspond to the ground plane or lie below the ground plane are removed from the point cloud data 116 to form the filtered point cloud data 206. This may be performed such that any points in the point cloud data 116 are removed that have a negative dot product of the ground plane within an error margin "e" as indicated by the user input 204. This acts to reduce a point cloud search space to improve efficiency and operation of the computing device 102. Other instances are also contemplated in which functionality of the ground point filtering module 202 is included as part of the AR module 110, itself. An example 400 of filtered point cloud data 206 is illustrated in FIG. 4.

Figure 5:
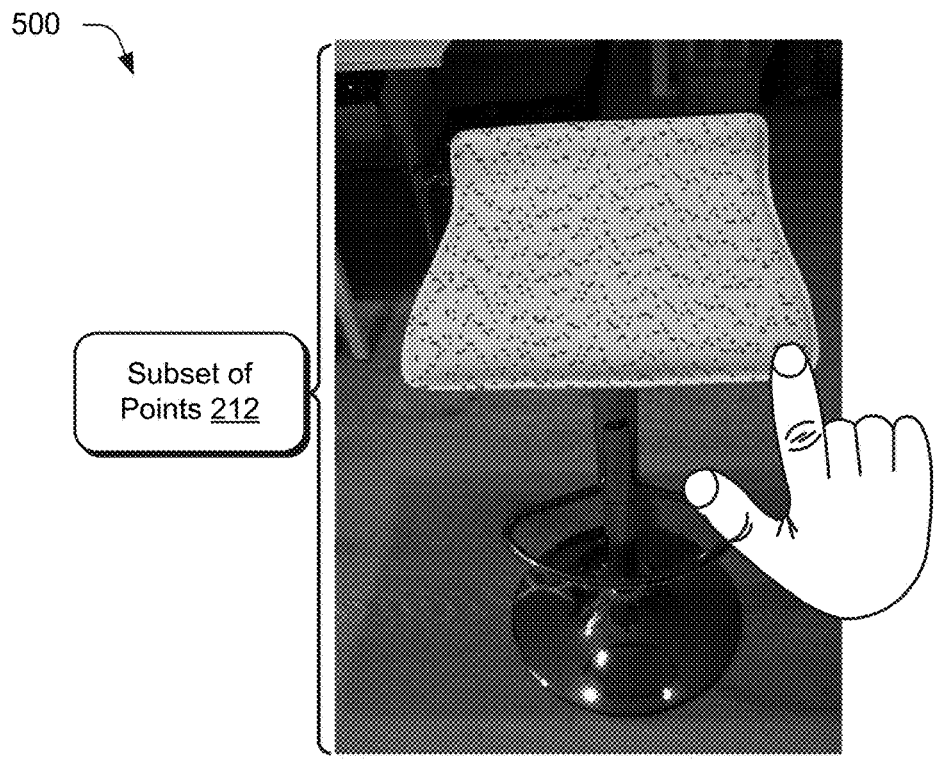
FIG. 5 depicts an example of a subset of points generated from the filtered point cloud data of FIG. 4 using a proximity search.

A user input 208 is then received that specifies a location of the physical object (block 1006) in the user interface. Continuing with the previous example, the computing device 102 may output a live camera feed in a user interface of digital images captured of the physical environment that correspond to the point cloud data 116. A user may then "tap" a location of a representation of the physical object 106 in the user interface as illustrated in FIG. 5.

A subset of points 212 within the filtered point cloud data 206 are then located by a proximity search module 210 that correspond to the physical object 106 (block 1008), e.g., via a nearest neighbor search. The proximity search module 210, for instance, may iteratively find each of the points in the filtered point cloud data 206 that are close to an initial selection point "p0" of the user input 208. This is achieved using a KD-tree to build up spatial indexing of the filtered point cloud data 206, and then query those points within a proximity "d" of the initial object selection point "p0,"

which are then added to a point set "ps." A proximity "d" of the newly added points within the set "ps" are further searched in a next iteration.

As more points are discovered within proximity "d," additional points are searched that are close to those newly discovered points until points are no longer found and added to the set "ps," thereby forming the subset of points 212. As part of this, a point in the subset of points 212 is found that is the furthest from the ground plane, i.e., the highest point. An example 500 of the subset of points 212 is illustrated in FIG. 5.

Figure 6:
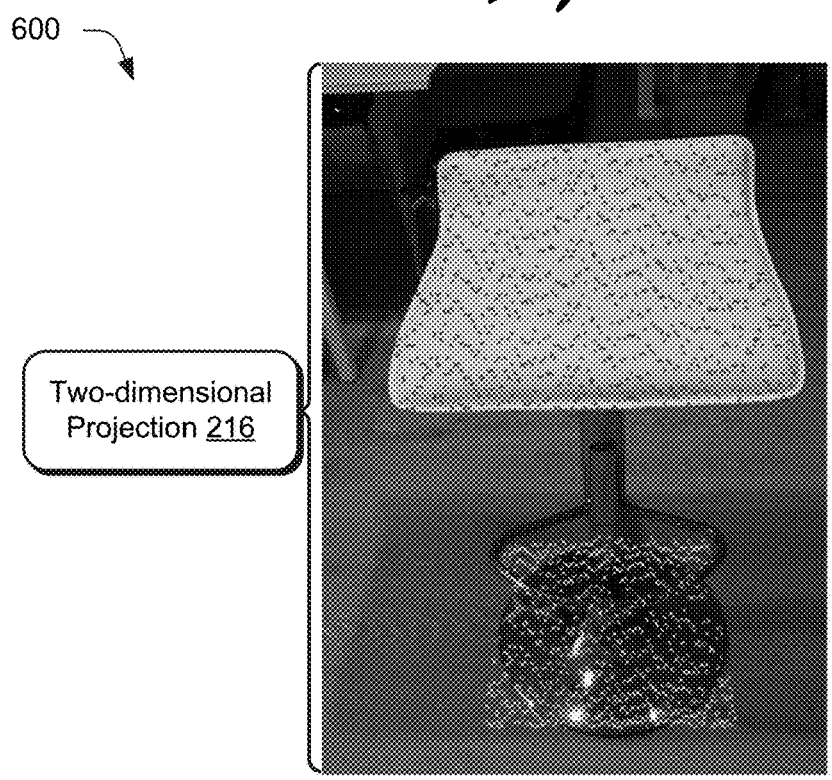
FIG. 6 depicts an example of generating a two-dimensional projection of the subset of points of FIG. 5.

The subset of points 212 is then received as an input by a two-dimensional projection module 214 that is configured to generate a two-dimensional projection 216 (block 1010). The two-dimensional projection module 214, for instance, may reset Y coordinates to zero for each of the points in the subset of points 212, an example 600 of which is illustrated in FIG. 6. This forms the two-dimensional projection 216 as the subset of points 212 as disposed on the ground plane.

Figure 7:
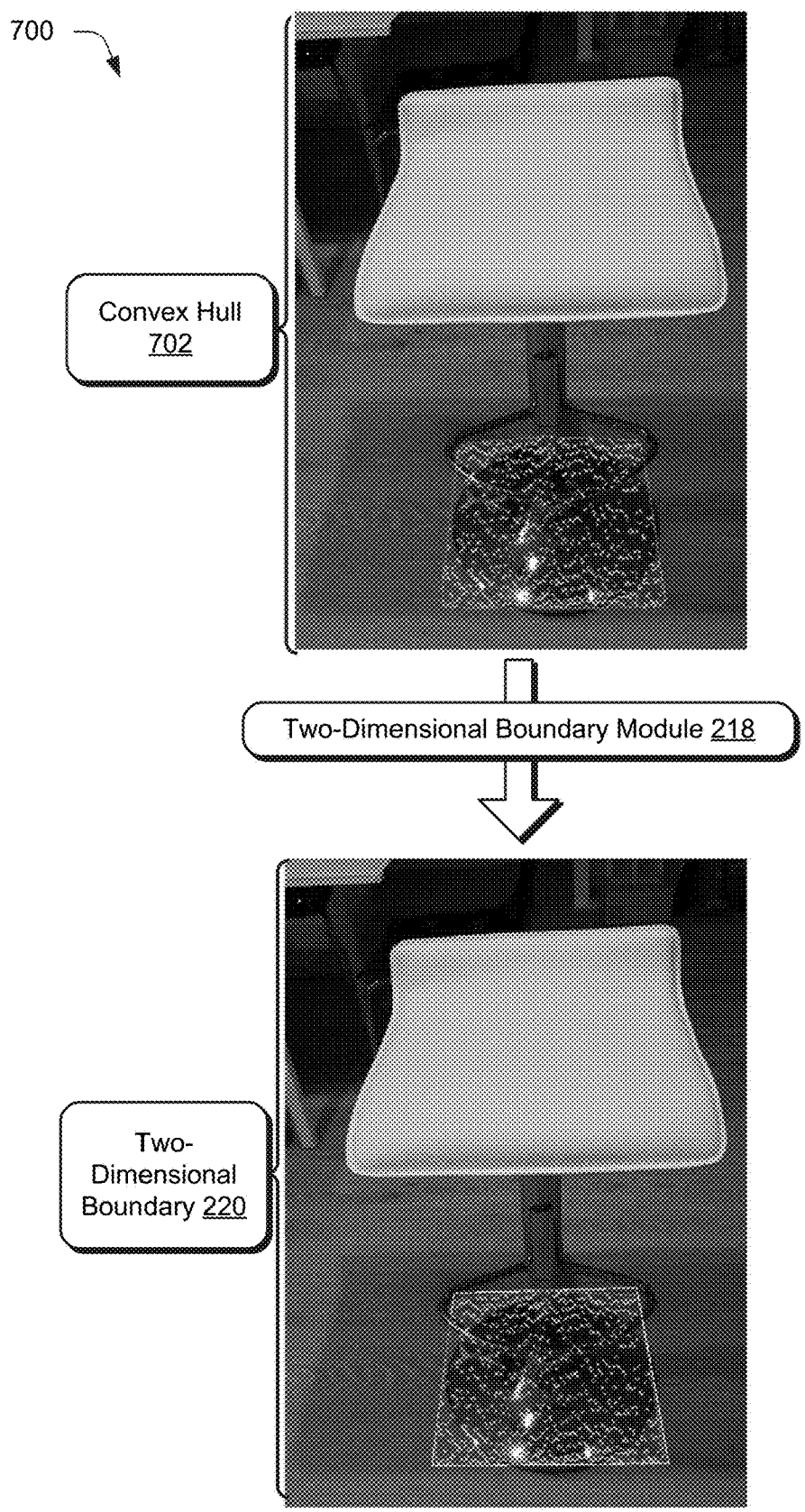
FIG. 7 depicts an example of generating a two-dimensional boundary from the two-dimensional projection of FIG. 6.

A two-dimensional boundary module 218 is then employed to generate a two-dimensional boundary 220 based on the two-dimensional projection 216, which may have a shape based on the projection. To do so as shown in an example 700 of FIG. 7, a two-dimensional convex hull 702 (i.e., a boundary shape) is calculated that surrounds the points in the two-dimensional projection 216 as projected on the ground plane by the two-dimensional boundary module 218. A rotating calipers technique is then used by the two-dimensional boundary module 218 to generate a minimum two-dimensional boundary 220 based on the two-dimensional convex hull.

Figure 8:
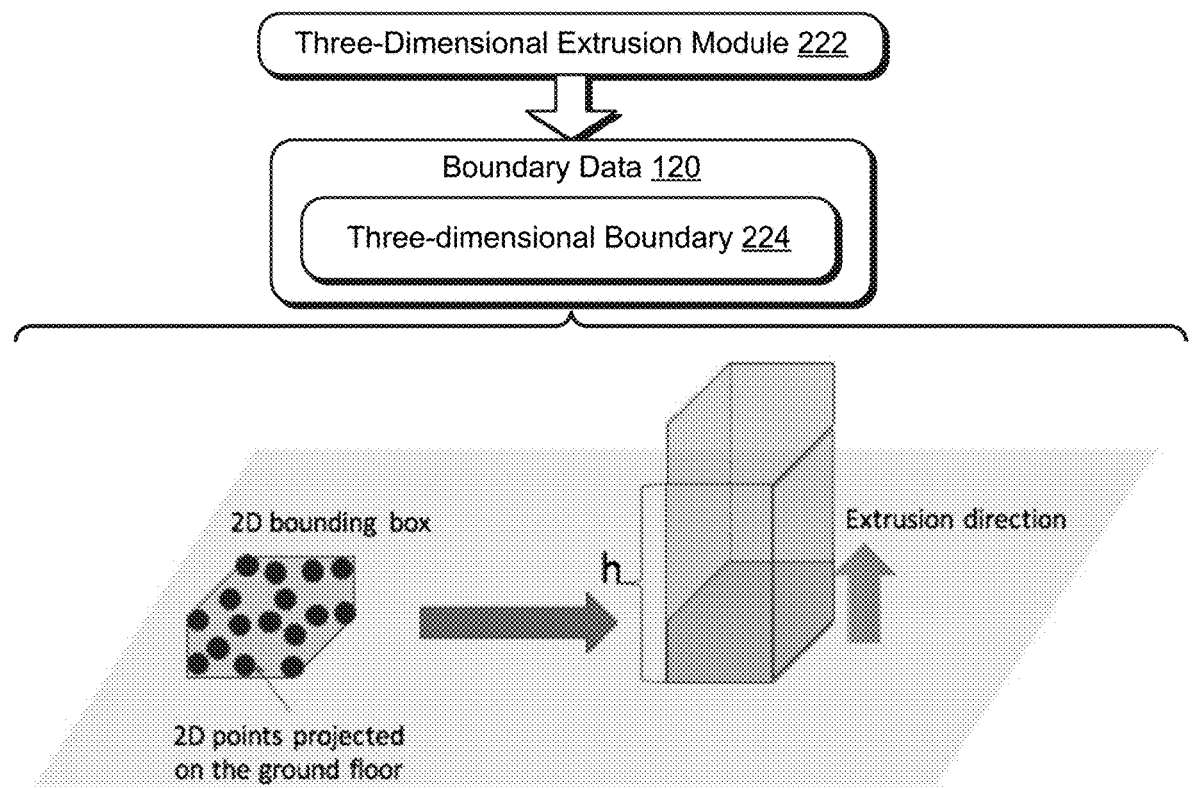
FIG. 8 depicts an example of generating a three-dimensional boundary from the two-dimensional boundary of FIG. 7 using extrusion.

The two-dimensional boundary 220 is then extruded by a three-dimensional extrusion module 222 into a three-dimensional boundary 224 (block 1012) as the boundary data 120 in this example. As shown in the example 800 of FIG. 8, a two-dimensional boundary is extended into a rectangular cuboid that shares a face with the two-dimensional boundary. The height of the three-dimensional boundary 224 is based on the point in the subset of points 212 that is located as part of the filtering that is the furthest from the ground plane, i.e., the highest point. Thus, the three-dimensional boundary 224 has a shape that is based on the two-dimensional boundary.

Figure 9:
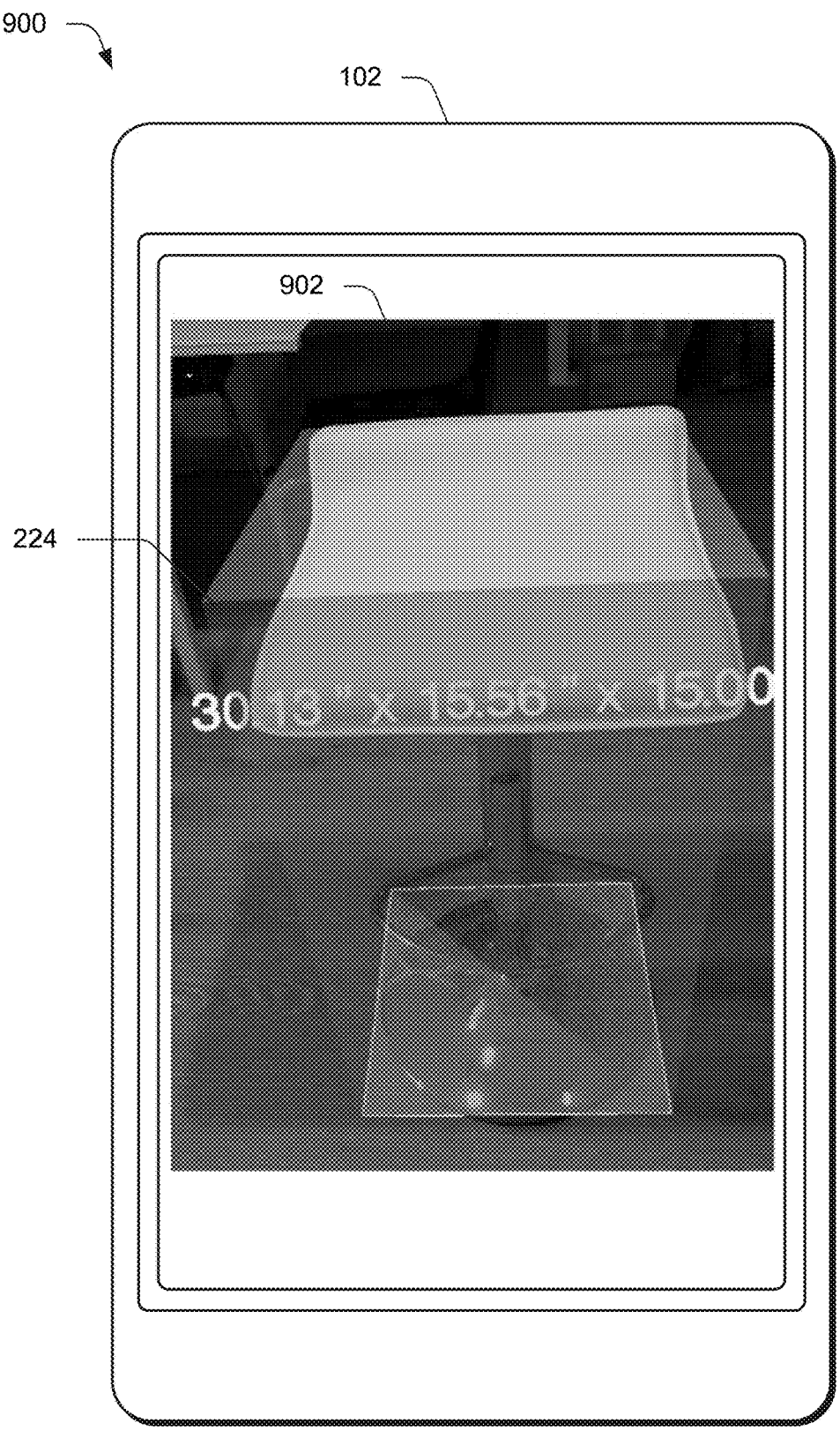
FIG. 9 depicts an example implementation in which the three-dimensional boundary of FIG. 8 is displayed in a user interface as augmented reality digital content as part of a live camera feed of the computing device of FIG. 1.

Dimensions of the three-dimensional boundary are displayed in the user interface (block 1014). As shown in the example 900 of FIG. 9, the three-dimensional boundary 224 is displayed as augmented reality digital content within a user interface 902 including a live camera feed. The three-dimensional boundary 224 in this example encompasses a representation (e.g., displayed around) of the physical object in the digital images.

The three-dimensional boundary 224 may be leveraged to support a variety of functionality. Returning of FIG. 1, for instance, boundary data 120 that includes the three-dimensional boundary 224 may be communicated over a network 124 to a service provider system 126. A service manager module 128 of the service provider system 126 then generates shipping data 108 based on this box. The service manager module 128, for instance, may employ a packing materials service 140 that is configured to determine packing materials (e.g., box, shape, envelope, and filler size) to be used to pack the physical object 106. For example, the packing material service 140 may select a size and shape of packaging materials based on dimensions of the three-dimensional boundary 224 as well as filler (e.g., bubble wrap) to be used as filler within a volume of the box. In this way, a correct size of the packaging materials and amounts of filler material may be determined accurately and automatically by the computing device 102 that is readily available to the user 104.

In another instance, a shipping service 142 is configured to estimate shipping costs of the physical object 106. The shipping service 142, for instance, may base the estimate on dimensions of the three-dimensional boundary. In a further instance, a digital commerce service 144 employs the boundary data 120 as part of generation of digital content, e.g., a webpage having an offer to sell the physical object 106 by the user 104. Continuing with the previous example, a webpage may be generated to offer the physical object 106 for sale. As part of this generation by an application executed by the computing device 102, the three-dimensional boundary 224 is generated and used to generate shipping data 108, e.g., as part of capturing digital images that are also to be included as part of the digital content from multiple perspectives. In this way, the techniques may efficiently leverage capture of these digital images for dual purposes, thereby improving efficiency in operation of the computing device 102.

Figure 11:
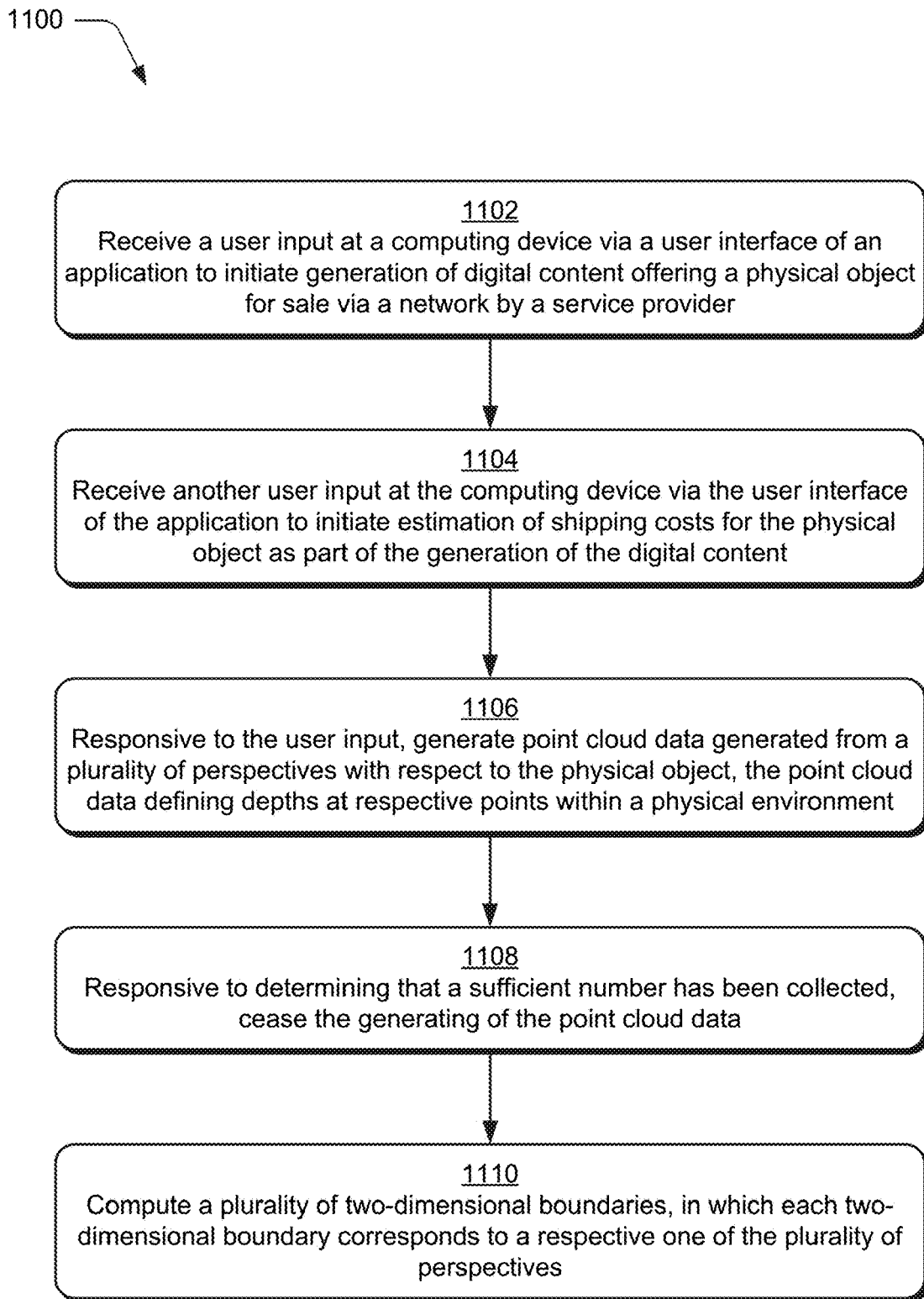
FIG. 11 is a flow diagram depicting a procedure in an example implementation in which two-dimensional boundaries are generated based on point cloud data generated from a plurality of perspectives of a physical object.
Figure 12:
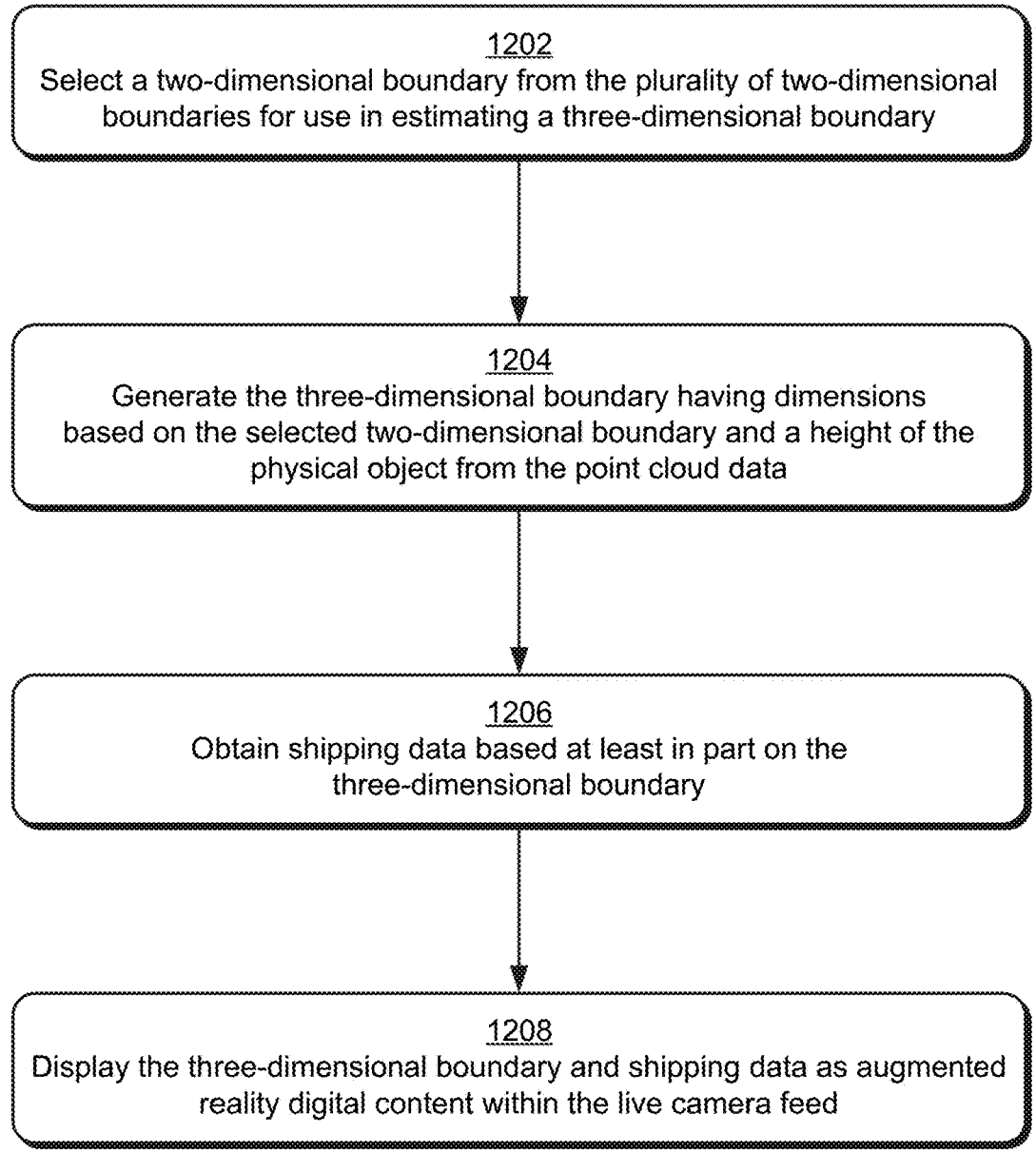
FIG. 12 is a flow diagram depicting a procedure in an example implementation in which a two-dimensional boundary is selected from the two-dimensional boundaries of FIG. 11 and used to generate a three-dimensional boundary.

FIGS. 11 and 12 depict another example 1100, 1200 of physical object boundary detection techniques and systems. In this example, a user input is received at a computing device 102 via a user interface to initiate generation of digital content offering a physical object 106 for sale via a network by a service provider (block 1102). The application, for instance, may be executed by the computing device 102 as associated with the service provider system 126. The service provider system 126 includes a digital commerce service that is usable to offer products for sale. To do so, the digital content is generated to indicate availability of the physical object 106, e.g., a webpage, user interface screen for output in a mobile application, and so forth.

As part of this, a user input is received at the computing device 102 via the user interface of the application to initiate estimation of shipping costs for the physical object as part of the generation of the digital content (block 1104). Accordingly, point cloud data 116 is generated as previously described from an AR module 110.

As previously described, the computing device 102 may leverages an AR module 110 to generate the point cloud data 116. The AR module 110 includes a three dimensional (3D) sensing device 112 and a point cloud generation module 114 that are configured to generate point cloud data 116 that describes depths at respective points within the physical environment. In a right-handed convention, for instance, the point cloud data 116 may describe points in which a y-axis is vertical, and x-axis is horizontal, and a z-axis defines depth as part of a coordinate system.

In one example, the 3D sensing device 112 and point cloud generation module 114 employ a technique referred to as visual-inertial odometry in which the 3D sensing device 112 includes motion detection sensors (e.g., gyroscopes, accelerometers) and a camera to capture digital images of the physical environment. The point cloud generation module 114 is configured to perform computer vision analysis of the digital images to recognize features in the digital images and track differences in positions of these features.

The point cloud generation module 114 compares motion sensing data from the motion detection sensors with the tracked differences in feature positions to generate point cloud data 116 that models depths of points in the physical environment, e.g., as a depth map. In this way, the AR module 110 may track position of the computing device 102 as it moves to build an understanding of the physical environment based on features identified from digital images. This functionality may also support ground plane detection, e.g., flat surface such as a floor or table. Thus, in this example the point cloud data 116 may be generated without specialized hardware by a wide range of mobile computing devices, e.g., smartphones and tablets.

In another example, dedicated hardware is leveraged to emit radio waves (e.g., Wi-Fi waves), the return of which is sensed (e.g., using radar techniques) by the 3D sensing device 112. This includes use of motion tracking as described above (e.g., using accelerometers, barometers, GPS, and/or gyroscopes) such that the point cloud generation module 114 may gain an understanding of depths of points within the physical environment in order to generate the point cloud data 116. Other examples are also contemplated, such as time-of-flight cameras, structured light grid array devices, and so forth.

Figure 13:
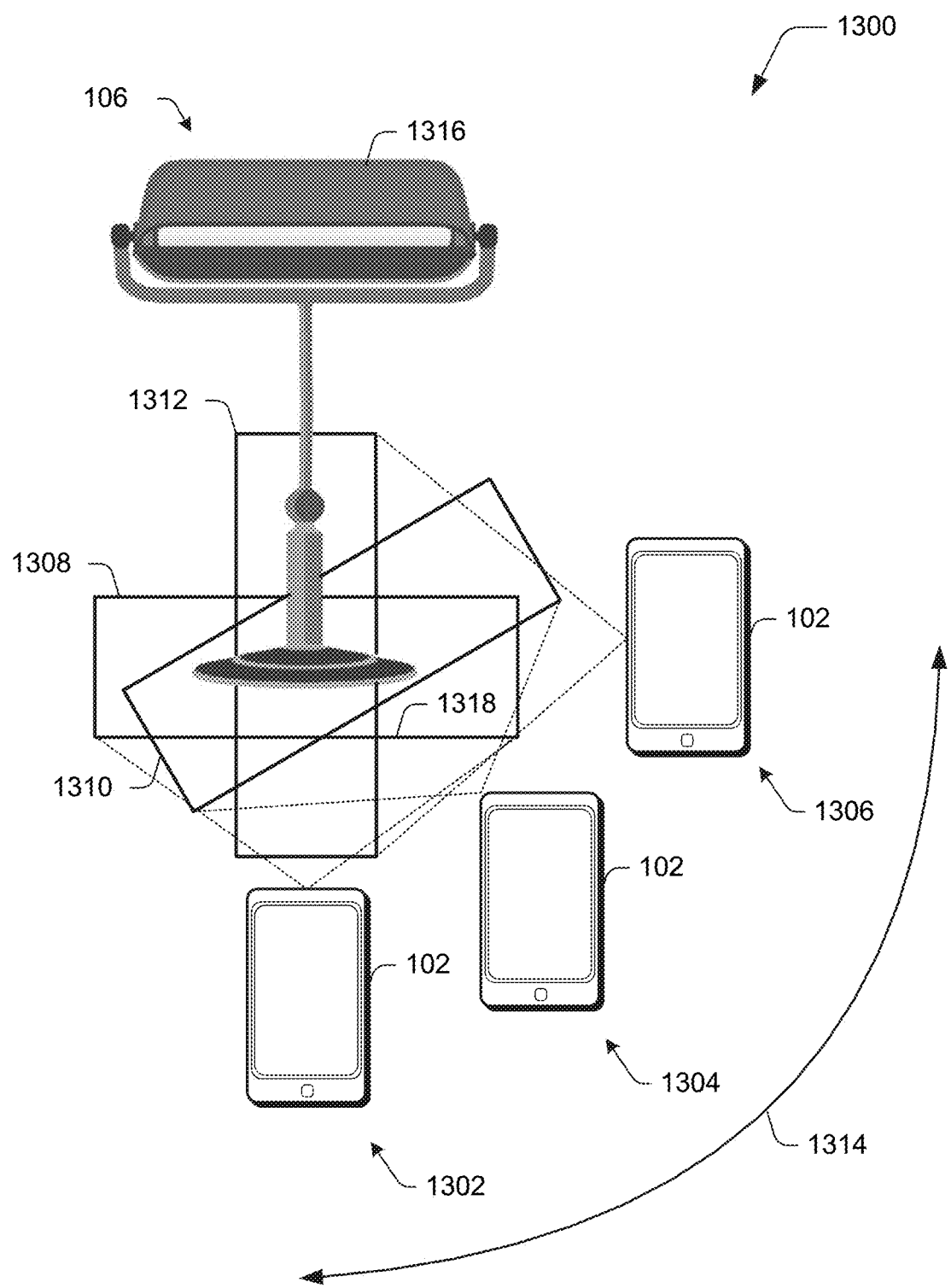
FIG. 13 depicts an example implementation of generation of point cloud data from a plurality of perspectives and generating two-dimensional boundaries for each of those perspectives.

FIG. 13 depicts an example implementation of generation of point cloud data from a plurality of perspectives and generating boundaries for each of those perspectives. In this example, the point cloud data 116 is captured from a plurality of different perspectives 1302, 1304, 1306 in relation to the physical object 106, e.g., top, side, front, back, and so forth. The point cloud data defines depths at respective points within the physical environment (block 1106).

The AR module 110, for instance, may include functionality for hit-testing points to indicate a distance from a camera to a nearest object along a vector in the camera frustum. Using these capabilities, the AR module 110 builds a one centimeter grid of points and hit-tests multiple points each frame to build a depth map of the physical environment in real time. This produces the point cloud data 116 of points within the object, with points that are within a defined distance from a ground plane removed.

The physical object boundary detection module 118 is configured to determine when a sufficient number of points are collected from a sufficient number of perspectives, and in response, cease the generating of the point cloud data 116 by the AR module 110. This acts to conserve computational resources of the computing device 102. This also supports user feedback indicating a point in time, at which, the three dimensional bounding box may be generated.

The physical object boundary detection module 118 then computes a plurality of two-dimensional boundaries 1308, 1310, 1312, in which each two-dimensional boundary corresponds to a respective one of the plurality of perspectives 1302, 1304, 1306 (block 1110). To do so, the physical object boundary detection module 118 determines a best fit by rotating through a defined arc 1314 (e.g., ninety degrees) in increments (e.g., five degrees) and generate a two-dimensional boundary of the point cloud at each angle. In an implementation, the two-dimensional boundary has a shape that corresponds to a minimum area of the points at that perspective.

The physical object boundary detection module 118 then selects a two-dimensional boundary from the plurality of two-dimensional boundaries for use in estimating a bounding box (block 1202). The physical object boundary detection module 118, for instance, may select the two-dimensional boundary having the smallest (i.e., minimum) area.

The two-dimensional boundary is then used by the physical object boundary detection module 118 to generate a three-dimensional boundary having dimensions (e.g., and shape) based on the selected boundary and a height of the physical object taken from the point cloud data (block 1204). Points within the bounding box, for instance, may be compared along a Y axis to determine the point 1316 or cluster of points in the point cloud data that has the maximum distance from the ground plane 1318. This defines a Y axis that, in conjunction with the size of the selected two-dimensional boundary having the minimum size define the three-dimensional boundary.

The three-dimensional boundary is then used by the shipping module 122 to obtain shipping data 108 (block 1206). Dimensions of the three-dimensional boundary, for instance, may be compared with dimensions of packaging materials to locate a box having a minimal size and shape and an amount of packing (e.g., "fill") to be used to back the physical object 106 within the box. This may also be used to estimate shipping costs. This shipping data 108 may be displayed in a user interface along with the three-dimensional boundary as augmented reality digital content within the live camera feed (block 1208). The shipping data 108 may also be included automatically and without user intervention as part of the digital content, e.g., in response to a user input "okaying" inclusion of this data as part of the offer to sell the physical object 106. In this way, the application supports efficient non-modal interaction to include this data as part of the digital content, and thus promotes user and operational efficiency.

Example System and Device

Figure 14:
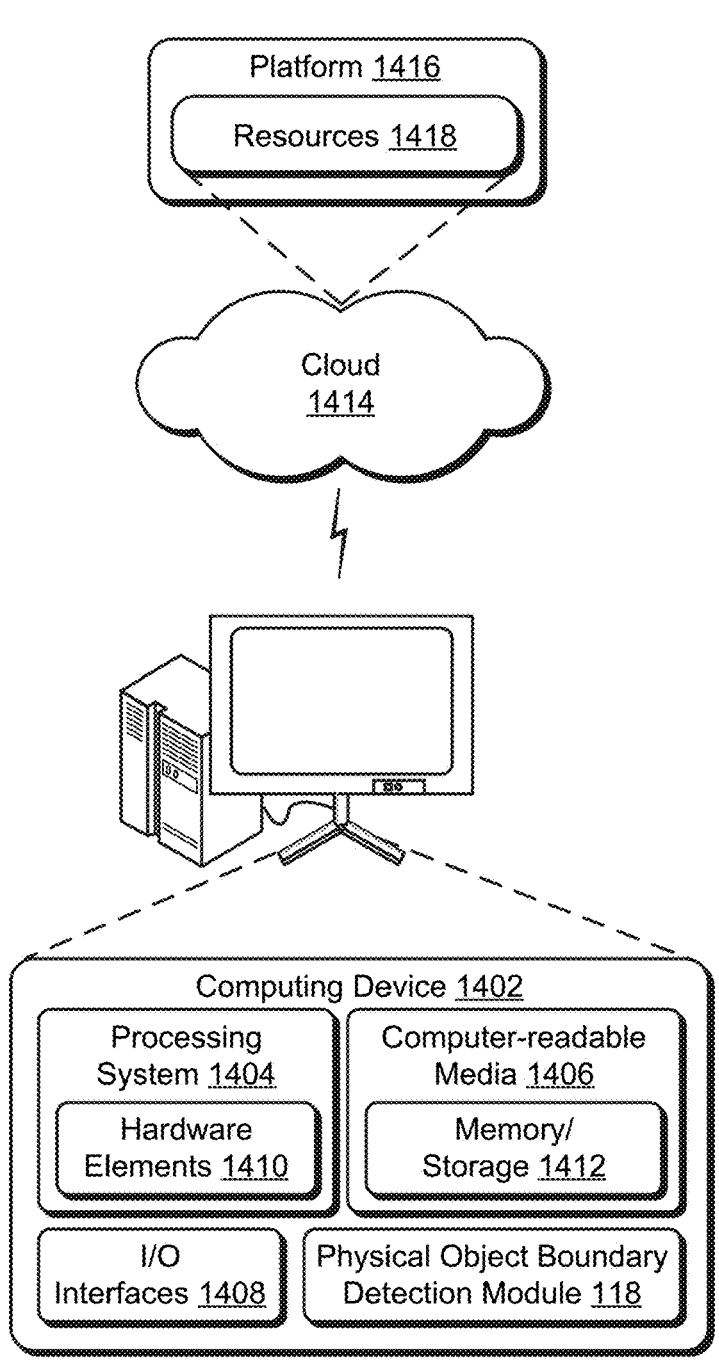
FIG. 14 illustrates an example system including various components of an example device that can be implemented as any type of computing device as described and/or utilize

FIG. 14 illustrates an example system generally at 1400 that includes an example computing device 1402 that is representative of one or more computing systems and/or devices that may implement the various techniques described herein. This is illustrated through inclusion of the physical object boundary detection module 118. The computing device 1402 may be, for example, a server of a service provider, a device associated with a client (e.g., a client device), an on-chip system, and/or any other suitable computing device or computing system.

The example computing device 1402 as illustrated includes a processing system 1404, one or more computer-readable media 1406, and one or more I/O interface 1408 that are communicatively coupled, one to another. Although not shown, the computing device 1402 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1404 is representative of functionality to perform one or more operations using hardware. Accordingly, the processing system 1404 is illustrated as including hardware element 1410 that may be configured as processors, functional blocks, and so forth. This may include implementation in hardware as an application specific integrated circuit or other logic device formed using one or more semiconductors. The hardware elements 1410 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1406 is illustrated as including memory/storage 1412. The memory/storage 1412 represents memory/storage capacity associated with one or more computer-readable media. The memory/storage component 1412 may include volatile media (such as random access memory (RAM)) and/or nonvolatile media (such as read only memory (ROM), Flash memory, optical disks, magnetic disks, and so forth). The memory/storage component 1412 may include fixed media (e.g., RAM, ROM, a fixed hard drive, and so on) as well as removable media (e.g., Flash memory, a removable hard drive, an optical disc, and so forth). The computer-readable media 1406 may be configured in a variety of other ways as further described below.

Input/output interface(s) 1408 are representative of functionality to allow a user to enter commands and information to computing device 1402, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1402 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1402. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1402, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1410 and computer-readable media 1406 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1410. The computing device 1402 may be configured to implement particular instructions and/or functions corresponding to the software and/or hardware modules. Accordingly, implementation of a module that is executable by the computing device 1402 as software may be achieved at least partially in hardware, e.g., through use of computer-readable storage media and/or hardware elements 1410 of the processing system 1404. The instructions and/or functions may be executable/operable by one or more articles of manufacture (for example, one or more computing devices 1402 and/or processing systems 1404) to implement techniques, modules, and examples described herein.

The techniques described herein may be supported by various configurations of the computing device 1402 and are not limited to the specific examples of the techniques described herein. This functionality may also be implemented all or in part through use of a distributed system, such as over a "cloud" 1414 via a platform 1416 as described below.

The cloud 1414 includes and/or is representative of a platform 1416 for resources 1418. The platform 1416 abstracts underlying functionality of hardware (e.g., servers) and software resources of the cloud 1414. The resources 1418 may include applications and/or data that can be utilized while computer processing is executed on servers that are remote from the computing device 1402. Resources 1418 can also include services provided over the Internet and/or through a subscriber network, such as a cellular or Wi-Fi network.

The platform 1416 may abstract resources and functions to connect the computing device 1402 with other computing devices. The platform 1416 may also serve to abstract scaling of resources to provide a corresponding level of scale to encountered demand for the resources 1418 that are implemented via the platform 1416. Accordingly, in an interconnected device embodiment, implementation of functionality described herein may be distributed throughout the system 1400. For example, the functionality may be implemented in part on the computing device 1402 as well as via the platform 1416 that abstracts the functionality of the cloud 1414.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by at least one computing device, the comprising:
    obtaining, by the at least one computing device, point cloud data defining depths at respective points within a physical environment that includes a physical object;
    filtering, by the at least one computing device, the point cloud data by removing points from the point cloud data that correspond to a ground plane;
    receiving, by the at least one computing device via a user interface, a user input specifying a location of the physical object;
    locating, by the at least one computing device, a subset of the points within the filtered point cloud data that correspond to the physical object, the locating performed using a proximity search based on the location of the user input;
    generating, by the at least one computing device, a two-dimensional boundary based on the located subset;
    extruding, by the at least one computing device, the two-dimensional boundary into a three-dimensional boundary;
    generating, by the at least one computing device, shipping data based on the three-dimensional boundary; and
    displaying, by the at least one computing device, the three-dimensional boundary and the shipping data in the user interface.

2. The method as described in claim 1, wherein the user interface includes a display of a digital image of the physical environment as part of a live camera feed that includes the physical object and corresponds to the point cloud data.

3. The method as described in claim 2, wherein the filtering is based on another user input received via the user interface as indicating a location of the ground plane in the point cloud data.

4. The method as described in claim 1, wherein the locating is based on a nearest neighbor search.

5. The method as described in claim 1, wherein the generating of the two-dimensional boundary includes:
    projecting the located subset of the points onto the ground plane;
    calculating a convex hull that surrounds the projected points; and
    generating the two-dimensional boundary from the convex hull using a rotating calipers technique.

6. The method as described in claim 1, wherein:
    the filtering includes determining a height of a point in the filtered point cloud data that is furthest from the ground plane; and
    the extruding is based on the height such that the three-dimensional boundary has the height.

7. The method as described in claim 1, wherein the displaying including displaying the dimensions as augmented reality digital content with respect to the physical object in the user interface.

8. The method as described in claim 1, wherein the obtained point cloud data is a version that is down sampled from data generated by a point cloud generation module.

9. The method as described in claim 1, wherein the shipping data describes an estimated shipping cost based on dimensions of the three-dimensional boundary.

10. The method as described in claim 1, wherein the user interface includes digital images as a live camera feed the displaying includes displaying the three-dimensional boundary and the shipping data as augmented reality digital content as disposed along with the physical object.

11. A method comprising:
    displaying, by the at least one computing device, a live camera feed of digital images in a user interface;
    generating, by the at least one computing device, point cloud data generated from a plurality of perspectives with respect to a physical object, the point cloud data defining depths at respective points within the physical environment;
    computing, by the at least one computing device, a plurality of two-dimensional boundaries, in which each said boundary corresponds to a respective one of the plurality of perspectives;
    selecting, by the at least one computing device, a two-dimensional boundary from the plurality of two-dimensional boundaries;
    generating, by the at least one computing device, a three-dimensional boundary having dimensions based on the selected two-dimensional boundary and a height of the physical object from the point cloud data;
    generating, by the at least one computing device, shipping data based at least in part on the three-dimensional boundary; and
    displaying, by the at least one computing device, the three-dimensional boundary and the shipping data as augmented reality digital content within the live camera feed.

12. The method as described in claim 11, wherein the shipping data is an estimated cost of shipping the physical object.

13. The method as described in claim 11, wherein the shipping data is a packaging size or shape to be used in packaging the physical object.

14. The method as described in claim 11, further comprising:
    receiving, by the at least one computing device via the user interface, a user input to initiate generation of digital content as part of an offer for sale of the physical object via a network by a service provider;
    receiving, by the at least one computing device via the user interface, another user input to initiate generation of the shipping data for the physical object as part of generation of the digital content and wherein the displaying of the live camera feed is performed responsive to the other user input; and
    generating, by the at least one computing device, the digital content as including the shipping data.

15. A computing device comprising:
    a display device;
    an augmented reality module including a three-dimensional sensing device and point cloud generation module implemented at least partially in hardware to generate point cloud data defining depths at respective points of a physical object within the physical environment; and a physical object boundary detection module implemented at least partially in hardware to generate a three-dimensional boundary from the point cloud data and to generate shipping data based on the three-dimensional boundary, the three-dimensional boundary and shipping data output as augmented reality digital content in a live camera feed of the physical object in a user interface by the display device.

16. The computing device as described in claim 15, wherein the shipping data is an estimated cost of shipping the physical object.

17. The computing device as described in claim 15, wherein the shipping data is a packaging size or shape to be used in packaging the physical object.

18. The computing device as described in claim 15, wherein the physical object boundary detection module is configured to generate the three-dimensional boundary by:
   computing a plurality of two-dimensional boundaries, in which each said two-dimensional boundary corresponds to a respective one of a plurality of perspectives captured by the point cloud data;
   selecting a two-dimensional boundary from the plurality of two-dimensional boundaries; and
   generating the three-dimensional boundary having dimensions based on the selected boundary and a height of the physical object from the point cloud data.

19. The computing device as described in claim 15, wherein the physical object boundary detection module is configured to generate the three-dimensional boundary by:
   filtering the point cloud data by removing points from the point cloud data that correspond to a ground plane;
   receiving, via the user interface, a user input specifying a location of the physical object;
   locating a subset of points within the filtered point cloud data that correspond to the physical object, the locating performed using a proximity search based on the location of the user input;
   generating a two-dimensional boundary based on the located subset; and
   extruding the two-dimensional boundary into the three-dimensional boundary.

20. The method as described in claim 1, further comprising:
   receiving, by the at least one computing device via the user interface, a user input to initiate generation of digital content as part of an offer for sale of the physical object via a network by a service provider;
   receiving, by the at least one computing device via the user interface, another user input to initiate generation of the shipping data for the physical object as part of generation of the digital content; and
   generating, by the at least one computing device, the digital content as including the shipping data.

* * * * *

UNITED STATES PATENT AND TRADEMARK OFFICE
CERTIFICATE OF CORRECTION

PATENT NO. : 10,853,946 B2
APPLICATION NO. : 15/984140
DATED : December 1, 2020
INVENTOR(S) : Patrick Ryan Nelson et al.

Page 1 of 1

It is certified that error appears in the above-identified patent and that said Letters Patent is hereby corrected as shown below:

On the Title Page

In item (57), in Column 2, in "Abstract", Line 3, delete "three dimensional" and insert
-- three-dimensional --, therefor.

In the Claims

In Column 15, Lines 20-21, in Claim 1, delete "computing device, the comprising:" and insert
-- computing device, comprising: --, therefor.

Signed and Sealed this
Ninth Day of March, 2021

Drew Hirshfeld
*Performing the Functions and Duties of the
Under Secretary of Commerce for Intellectual Property and
Director of the United States Patent and Trademark Office*